US011336366B2

(12) United States Patent
Cui et al.

(10) Patent No.: US 11,336,366 B2
(45) Date of Patent: *May 17, 2022

(54) DYNAMIC ADJUSTMENT OF INTEGRATED ACCESS AND BACKHAUL LINK PARTITION FOR EMERGENCY COMMUNICATIONS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Paul Smith, Jr., Heath, TX (US); Sangar Dowlatkhah, Alpharetta, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/824,146

(22) Filed: Mar. 19, 2020

(65) Prior Publication Data

US 2020/0220615 A1 Jul. 9, 2020

Related U.S. Application Data

(63) Continuation of application No. 16/056,006, filed on Aug. 6, 2018, now Pat. No. 10,637,563.

(51) Int. Cl.
*H04W 4/90* (2018.01)
*H04B 7/26* (2006.01)
(Continued)

(52) U.S. Cl.
CPC ............ *H04B 7/2606* (2013.01); *H04W 4/90* (2018.02); *H04W 88/10* (2013.01); *H04W 92/20* (2013.01)

(58) Field of Classification Search
CPC ....................................................... H04L 12/50
(Continued)

(56) References Cited

U.S. PATENT DOCUMENTS 5,594,943 A 1/1997 Balachandran
7,688,835 B2 3/2010 Kotzin et al.
(Continued)

FOREIGN PATENT DOCUMENTS

WO 2017/082949 A1 5/2017

OTHER PUBLICATIONS

Final Office Action received for U.S. Appl. No. 16/742,308 dated Apr. 14, 2021, 27 Pages.
(Continued)

*Primary Examiner* — Dang T Ton
(74) *Attorney, Agent, or Firm* — Amin, Turocy & Watson, LLP

(57) ABSTRACT

In response to a determination that network communication traffic at a network node relates to an emergency communication, a network controller can be operable to analyze a network condition associated with the network node. Based on an analysis of the network condition, the network controller can facilitate an adjustment to a partition of an integrated access and backhaul link. The network controller can further be operative to determine whether an operator policy is applicable to the adjustment of the partition. Additionally, the network controller can be operable to facilitate the selection of a path to route the emergency communication based upon the network condition and the operator policy.

20 Claims, 14 Drawing Sheets

(51) Int. Cl.
*H04W 88/10* (2009.01)
*H04W 92/20* (2009.01)

(58) Field of Classification Search
USPC .......................................................... 370/329
See application file for complete search history.

(56) References Cited

U.S. PATENT DOCUMENTS

| | | |
|---|---|---|
| 8,436,768 B2 | 5/2013 | Bull et al. |
| 8,627,468 B2 | 1/2014 | Kakadia et al. |
| 8,830,839 B2 | 9/2014 | Gan et al. |
| 8,838,110 B2 | 9/2014 | Zhang et al. |
| 8,848,534 B2 | 9/2014 | Yang et al. |
| 8,971,263 B2 | 3/2015 | Johansson et al. |
| 9,413,502 B2 | 8/2016 | Tellado et al. |
| 9,635,621 B2 | 4/2017 | Papasakellariou et al. |
| 9,642,146 B2 | 5/2017 | Zhang et al. |
| 2006/0083205 A1 | 4/2006 | Buddhikot et al. |
| 2008/0084855 A1 | 4/2008 | Rahman |
| 2008/0090575 A1 | 4/2008 | Barak et al. |
| 2009/0190522 A1 | 7/2009 | Horn et al. |
| 2009/0288144 A1 | 11/2009 | Huber et al. |
| 2009/0322510 A1 | 12/2009 | Berger et al. |
| 2010/0029282 A1 | 2/2010 | Stamoulis et al. |
| 2010/0260146 A1 | 10/2010 | Lu |
| 2014/0206368 A1 | 7/2014 | Maltsev et al. |
| 2015/0036571 A1 | 2/2015 | Taori et al. |
| 2015/0055623 A1 | 2/2015 | Li et al. |
| 2015/0071071 A1 | 3/2015 | Hughes et al. |
| 2015/0071248 A1 | 3/2015 | Faerber et al. |
| 2015/0119050 A1 | 4/2015 | Liao et al. |
| 2015/0373615 A1 | 12/2015 | Hampel |
| 2016/0143015 A1 | 5/2016 | Marsch et al. |
| 2016/0227432 A1* | 8/2016 | Freeman ........... H04W 72/0453 |
| 2016/0366632 A1 | 12/2016 | Liao et al. |
| 2017/0290049 A1 | 10/2017 | Reisslein et al. |
| 2017/0346525 A1 | 11/2017 | Stirling-Gallacher et al. |
| 2017/0347307 A1 | 11/2017 | Mehta et al. |
| 2018/0048442 A1 | 2/2018 | Sang et al. |
| 2018/0063731 A1 | 3/2018 | Ashrafi |
| 2018/0284735 A1 | 10/2018 | Celia et al. |

OTHER PUBLICATIONS

Ge, et al., "5G Wireless Backhaul Networks: Challenges and Research Advances," Sep. 2014, 15 Pages, IEEE.
Non-Final Office Action received for U.S. Appl. No. 14/735,279 dated Apr. 17, 2019, 23 pages.
Final Office Action received for U.S. Appl. No. 14/735,279 dated Sep. 1, 2017, 16 pages.
Non-Final Office Action received for U.S. Appl. No. 14/735,279 dated Feb. 21, 2018, 22 pages.
Final Office Action received for U.S. Appl. No. 14/735,279 dated Jun. 27, 2018, 31 pages.
Jaber, Mona, et al. "5G backhaul challenges and emerging research directions: A survey." IEEE access 4 (2016) 1743-1766. 24 pages.
Non-Final Office Action received for U.S. Appl. No. 14/735,279 dated Apr. 5, 2019, 20 pages.
Notice of Allowance received for U.S. Appl. No. 16/056,006 dated Dec. 20, 2019, 28 pages.
Non Final office action received for U.S. Appl. No. 16/742,308 dated Oct. 16, 2020, 34 Pages.
Office Action dated Aug. 19, 2021 for U.S. Appl. No. 16/742,308,m 18 pages.

* cited by examiner

Network Conditions Table (Access & Backhaul Network Graph) – When ERCN Traffic Not Present

| DU ID | ERCN Presence | DU Condition | | | DU Backhaul Conditions | | | |
|---|---|---|---|---|---|---|---|---|
| | | DU Profile | Access/BH Partition | Access Load % | Backhaul Link | Backhaul Link Characteristics | Backhaul Load % | Channel Condition |
| A | 0 | LTE, band x, macro, | | 40% | n/a | Fiber, 10G | 60% | excellent |
| a1 | 0 | LTE, band x, metro, 5w | 50/50Mhz | 60% | A1->A | | | |
| a2 | 0 | 5g, band y, mmW, 100 Mhz | 100/100Mhz | 60% | a2->a1<br>a2->a4 | | | |
| a3 | 0 | 5g, band y, mmW, 200 Mhz | 100/100Mhz | 60% | a3->a4<br>a3->a5 | 5G, band y, mmW, 100Mhz | 20% | poor |
| a4 | 0 | 5g, band y, mmW, 200 Mhz | 100/100Mhz | 50% | a4->A | 5G, band y, mmW, 200Mhz | 40% | |
| a5 | 0 | 5g, band y, mmW, 200 Mhz | 100/100Mhz | 50% | a5->A | | | |

FIG. 9

Network Conditions Table (Access & Backhaul Network Graph) – When ERCN Traffic Not Present

| DU ID | ERCN Presence | DU Condition ||||| DU Backhaul Conditions ||||
|---|---|---|---|---|---|---|---|---|
| | | DU Profile | Access/BH Partition | Access Load % | Backhaul Link ID | DU Backhaul Characteristics | Backhaul Load % | Channel Condition |
| A | 1 | LTE, band x, macro, | | 40% | n/a | Fiber, 10G | 60% | excellent |
| a1 | 1 | LTE, band x, metro, 5w | 1005 | | A1->A | | | |
| a2 | 1 | 5g, band y, mmW, 100 Mhz | 40/60Mhz | 50% | a2->a1<br>a2->a4 | | | |
| a3 | 1 | 5g, band y, mmW, 200 Mhz | 80/120Mhz | 60% | a3->a4<br>a3->a5 | 5G, band y, mmW,100Mhz<br>5G, band y, mmW, 200Mhz | 20%<br>40% | poor |
| a4 | 1 | 5g, band y, mmW, 200 Mhz | 100/100Mhz | 50% | a4->A | | | |
| a5 | 0 | 5g, band y, mmW, 200 Mhz | 100/100Mhz | 50% | a5->A | | | |

FIG. 10

DYNAMIC ADJUSTMENT OF INTEGRATED ACCESS AND BACKHAUL LINK PARTITION FOR EMERGENCY COMMUNICATIONS

RELATED APPLICATION

The subject patent application is a continuation of, and claims priority to, U.S. patent application Ser. No. 16/056,006, filed Aug. 6, 2018, and entitled "DYNAMIC ADJUSTMENT OF INTEGRATED ACCESS AND BACKHAUL LINK PARTITION FOR EMERGENCY COMMUNICATIONS," the entirety of which application is hereby incorporated by reference herein.

TECHNICAL FIELD

The present application relates generally to the field of wireless communication and, more specifically, to adjustment of an integrated access and backhaul (IAB) communication link partition for emergency communications.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including Long Term Evolution (LTE) and variants of LTE). Fifth generation (5G) access networks, which can also be referred to as New Radio (NR) access networks, are currently being developed and expected to fulfill the demand for exponentially increasing data traffic, and to handle a very wide range of use cases and requirements, including among others mobile broadband (MBB) services, enhanced mobile broadband (eMBB) services and machine type communications (e.g., involving Internet of Things (IOT) devices).

In particular, NR access networks will seek to utilize the wireless communications links between donor distributed unit (DU) devices and relay distributed unit (DU) devices (backhaul links), and also utilize the communications links between distributed units and user equipment (UEs) (access links), employing techniques for integrated access and backhaul (IAB), which is not without challenges, including for managing IAB links when emergency communications traffic is present.

The above-described background relating to wireless networks is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject application are described with reference to the following figures, wherein like reference numerals refer to like parts throughout the various views unless otherwise specified.

FIG. 9 illustrates a table comprising network conditions information, wherein emergency responders communication network traffic is not present, in accordance with various aspects and example embodiments of the subject application.

FIG. 10 illustrates a table comprising network conditions information, wherein emergency responders communication network traffic is present, in accordance with various aspects and example embodiments of the subject application.

DETAILED DESCRIPTION

Figure 1:
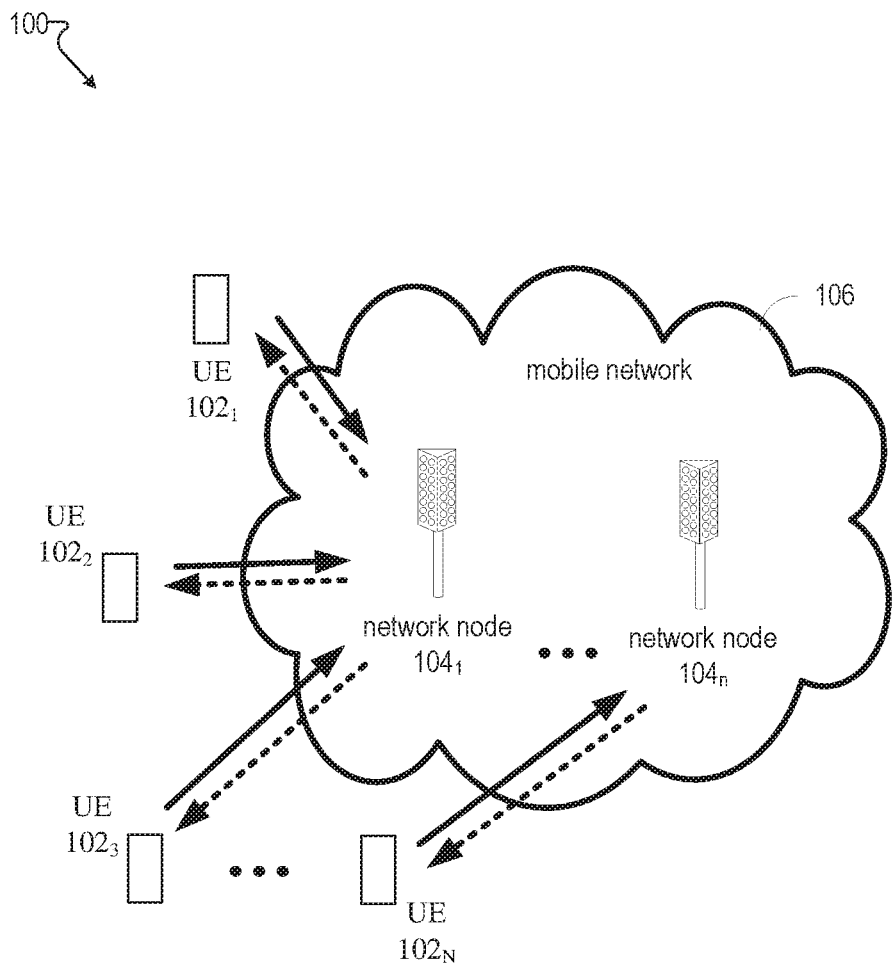
FIG. 1 illustrates an example wireless communication system having a network node device (also referred to herein as a network node) and one or more user equipment (UE), in accordance with various aspects and example embodiments of the subject application.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a more thorough understanding of the subject disclosure. It may be evident, however, that the subject disclosure can be practiced without these specific details. In other instances, structures and devices are shown in block diagram form to facilitate describing the subject disclosure.

The methods and operations (e.g., processes and logic flows) described in this specification can be performed by devices (e.g., a network controller 605, relay DUs, donor DUs, etc.) comprising processors that execute machine executable instructions (e.g., computer program product, computer-readable instructions, software, software programs, software applications, software modules, etc.) that facilitate performance of the operations described herein. Examples of such devices can be devices comprising circuitry and components as described in FIG. 14.

The present patent application provides for a power control system and process, whereby a power control adjustment is determined by a relay distributed unit device, based on a measurement of the power level of received access uplink (UL) transmissions, and a measurement of the power level of a reference signal received from a donor DU via a backhaul downlink (DL) transmission. The power control adjustment is transmitted to the donor distributed unit device, which uses the power control adjustment to reduce the amount of power of DL transmissions to the relay distributed unit device.

In accordance with various aspects and embodiments of the subject application, a network controller can be operable to analyze a network condition associated with the network node in response to a determination that network communication traffic at a network node relates to an emergency communication. Based on an analysis of the network condition, the network controller can facilitate an adjustment to a partition of an integrated access and backhaul link. The network controller can further be operative to determine whether an operator policy is applicable to the adjustment of the partition. Additionally, the network controller can select a path to route the emergency communication based upon the network condition and the operator policy.

FIG. 1 illustrates an example wireless communication system 100 (also referred to as wireless system 100, mobile system 100, mobile communications system 100) in accordance with various aspects and embodiments of the subject application. In example embodiments (also referred to as non-limiting embodiments), wireless communications system 100 can comprise a mobile (also referred to as cellular) mobile network 106, which can comprise one or more mobile networks typically operated by communication service providers. The wireless communication system 100 can also comprise one or more user equipment UE (e.g., UEs 102$_{1-N}$ in the plural, UEs 102 in the plural, UE 102 in the singular in general). UEs 102$_{1-N}$ can communicate with one another via one or more network node devices (also referred to as network nodes) (e.g., network nodes 104$_{1-N}$ in the plural, network nodes 104 in the plural, network node 104 in the singular in general) of the mobile network 106. The dashed arrow lines from the network nodes 104$_{1-N}$ to the UEs 102$_{1-N}$ represent downlink (DL) communications and the solid arrow lines from the UEs 102$_{1-N}$ to the network nodes 104$_{1-N}$ represent uplink (UL) communications.

UE 102 can comprise, for example, any type of device that can communicate with mobile network 106, as well as other networks (see below). The UE 102 can have one or more antenna panels having vertical and horizontal elements. Examples of a UE 102 comprise a target device, device to device (D2D) UE, machine type UE, or UE capable of machine to machine (M2M) communications, personal digital assistant (PDA), tablet, mobile terminal, smart phone, laptop mounted equipment (LME), universal serial bus (USB) dongles enabled for mobile communications, a computer having mobile capabilities, a mobile device such as cellular phone, a dual mode mobile handset, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. UE 102 can also comprise IOT devices that communicate wirelessly.

Mobile network 106 can include various types of disparate networks implementing various transmission protocols, including but not limited to cellular networks, femto networks, picocell networks, microcell networks, internet protocol (IP) networks, Wi-Fi networks associated with the mobile network (e.g., a Wi-Fi "hotspot" implemented by a mobile handset), and the like. For example, in at least one implementation, wireless communications system 100 can be or can include a large scale wireless communication network that spans various geographic areas, and comprise various additional devices and components (e.g., additional network devices, additional UEs, network server devices, etc.).

Still referring to FIG. 1, mobile network 106 can employ various cellular systems, technologies, and modulation schemes to facilitate wireless radio communications between devices (e.g., the UE 102 and the network node 104). While example embodiments might be described for 5G New Radio (NR) systems, the embodiments can be applicable to any radio access technology (RAT) or multi-RAT system where the UE operates using multiple carriers. For example, wireless communications system 100 can be of any variety, and operate in accordance with standards, protocols (also referred to as schemes), and network architectures, including but not limited to: global system for mobile communications (GSM), 3GSM, GSM Enhanced Data Rates for Global Evolution (GSM EDGE) radio access network (GERAN), Universal Mobile Telecommunications Service (UMTS), General Packet Radio Service (GPRS), Evolution-Data Optimized (EV-DO), Digital Enhanced Cordless Telecommunications (DECT), Digital AMPS (IS-136/TDMA), Integrated Digital Enhanced Network (iDEN), Long Term Evolution (LTE), LTE Frequency Division Duplexing (LTE FDD), LTE time division duplexing (LTE TDD), Time Division LTE (TD-LTE), LTE Advanced (LTE-A), Time Division LTE Advanced (TD-LTE-A), Advanced eXtended Global Platform (AXGP), High Speed Packet Access (HSPA), Code Division Multiple Access (CDMA), Wideband CDMA (WCMDA), CDMA2000, Time Division Multiple Access (TDMA), Frequency Division Multiple Access (PUMA), Multi-carrier Code Division Multiple Access (MC-CDMA), Single-carrier Code Division Multiple Access (SC-CDMA), Single-carrier FDMA (SC-FDMA), Orthogonal Frequency Division Multiplexing (OFDM), Discrete Fourier Transform Spread OFDM (DFT-spread OFDM), Single Carrier FDMA (SC-FDMA), Filter Bank Based Multi-carrier (FBMC), zero tail DFT-spread-OFDM (ZT DFT-s-OFDM), Unique Word OFDM (UW-OFDM), Unique Word DFT-spread OFDM (UW DFT-Spread-OFDM), Cyclic Prefix OFDM (CP-OFDM), resource-block-filtered OFDM, Generalized Frequency Division Multiplexing (GFDM), Fixed-mobile Convergence (FMC), Universal Fixed-mobile Convergence (UFMC), Multi Radio Bearers (RAB), Wi-Fi, Worldwide Interoperability for Microwave Access (WiMax), and the like.

Still referring to FIG. 1, in example embodiments, UE 102 can be communicatively coupled (or in other words, connected) to a network node 104 of the mobile network 106. Network node 104 can have a cabinet and other protected enclosures, an antenna mast, and multiple antennas for performing various transmission operations (e.g., multiple input multiple output (MIMO) operations). Each network node 104 can serve several cells, also called sectors, depending on the configuration and type of antenna. Network node 104 can comprise NodeB devices, base station (BS) devices, mobile stations, access point (AP) devices, and radio access network (RAN) devices. Network node 104 can also include multi-standard radio (MSR) radio node devices, including but not limited to: an MSR BS, an eNode B device (e.g., evolved NodeB), a network controller, a radio network controller (RNC), a base station controller (BSC), a relay device, a base transceiver station (BTS), an access point, a transmission point (TP), a transmit and receive point (TRP), a transmission node, a remote radio unit (RRU), a remote radio head (RRH), nodes in distributed antenna system (DAS), distributed unit (DU), and the like. In 5G terminology, the network node is referred to by some as a gNodeB device.

Still referring to FIG. 1, in various embodiments, mobile network 106 can be configured to provide and employ 5G cellular networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

Still referring to FIG. 1, to meet the demand for data centric applications, features of proposed 5G networks may comprise: increased peak bit rate (e.g., 20 Gbps), larger data volume per unit area (e.g., high system spectral efficiency— for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 Gbps to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Figure 2:
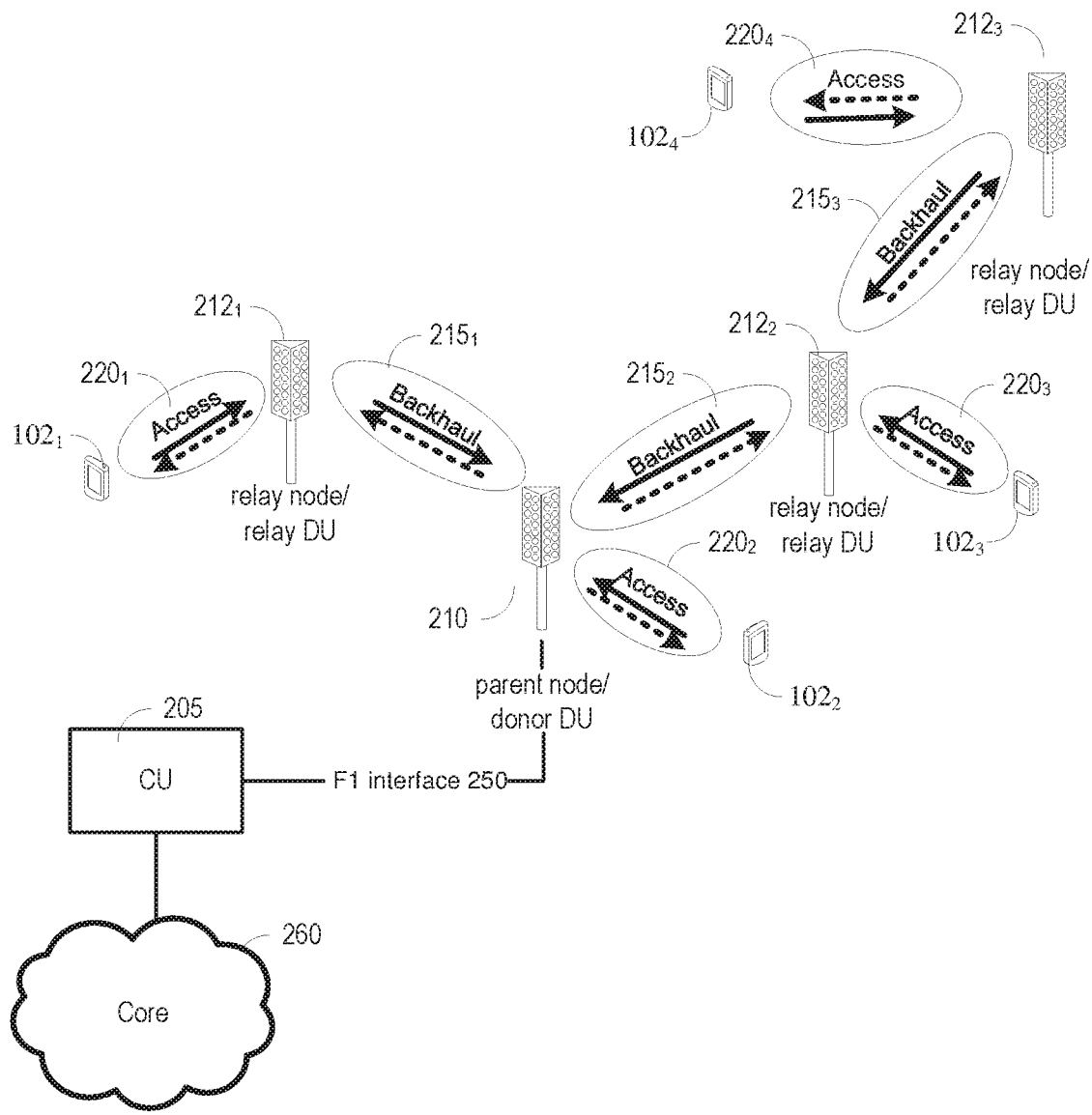
FIG. 2 illustrates an example wireless communication system, wherein a donor distributed unit (DU) can communicate via other DUs (e.g., relay DUs) via backhaul communication links, and with UEs via access communication links, in accordance with various aspects and example embodiments of the subject application.

FIG. 2 illustrates an example embodiment of a mobile network (e.g., wireless communications system 100) in which non-real-time control functions are centrally hosted (e.g., in a central unit (CU) 205) to direct transmissions across coverage areas, while real time functions are deployed at distributed units (DUs) that can manage the air interface resources between the DUs and UEs. In this RAN protocol architecture, which is native to the 3GPP specification and can be expected to be employed in the upcoming 5G RAN network, some of the various functionalities of a network node (e.g., network node 104) can be split and implemented in DUs.

In example embodiments, an integrated access and backhaul environment can be implemented, wherein the backhaul transmission links between donor units, and the access transmission links between donor units and UEs, can be integrated. In this implementation, DUs can comprise a donor DU 210 that communicate with one or more relay DUs (e.g., relay DU $212_1$, relay DU $212_2$) utilizing wireless "backhaul" links (e.g., backhaul links $215_{1-N}$ in the plural, backhaul links 215 in the plural, backhaul link 215 in the singular in general). A donor DU 210 and a relay DU 212 and can communicate with one or more UEs (for example, in FIG. 3, UEs $102_{1-4}$) using wireless "access" links (e.g., access links $220_{1-N}$ in the plural, access links 220 in the plural, access link 220 in the singular in general).

Relay DUs can be located closer to the edge of a cell, and can aid in meeting the ever-increasing demand for coverage and capacity. In example embodiments, a relay DU is typically smaller in size than a network node (e.g., network node 104), can vary in size, has lower power consumption, frequency (e.g., some relay DUs will be mmWave DUs), and can connect via a backhaul link to another DU (which can be a donor DU or another relay DU), and can communicate via access links with UEs (e.g., UEs 104).

Donor DUs are sometimes referred to as transmission-receive points (TRPs), and relay DUs are sometimes referred to as rTRPs. Donor DUs are also referred to as parent nodes, and relay DUs are also referred to as relay nodes. Donor DUs can reside at a macrosite, whereas metrosites can refer to locations that accommodate relay DUs of different sizes (e.g., smaller-sized relay DUd, medium-sized relay DUs).

Of note, the backhaul and access links share the same spectrum, and as such, the communications between the donor DUs, relay DUs, and the UEs can be said to be integrated, and referred to as integrated access and backhaul (IAB) links. A donor DU might be receiving communication transmissions from a relay DU on a backhaul link, and also might be receiving communications from one or more UEs on access links, with some overlapping spectrum as well as overlapping air space. Due to the expected larger bandwidth available for NR compared to LTE (e.g. mmWave spectrum) along with the native deployment of massive MIMO or multi-beam systems in NR, there is now an opportunity to develop and deploy IAB links. IAB links can allow for easier deployment of a dense network of self-backhauled NR cells in a more integrated manner by building upon many of the control and data channels/procedures defined for providing access to UEs.

As an example, still referring to FIG. 2, a UE (e.g., UE $102_1$ as shown in FIG. 2) can transmit a signal via a wireless access link (e.g., access link $220_1$) to relay DU $212_1$, which can then relay the signal via a backhaul link (e.g., backhaul link $215_1$) to the donor DU 210. In this instance, the relay DU $212_1$ is using both an access and backhaul link for transmissions. In some instances, a donor DU 210 can communicate between a relay DU, and also communicate with one or more UEs. For example, as shown in FIG. 2, donor DU 210 can communicate with relay DU $212_1$ and relay DU $212_2$; it can also communicate on access link $220_2$ with UE $102_2$. Additionally, donor DU can be sending to and receiving signals from both UE $102_2$ and from relay DU $212_1$. And relay DU $212_2$. Also, in the example of FIG. 2, a relay DU $212_3$ can communicate with a UE on access link $220_4$ and relay DU $212_3$ can also communicate with relay DU $212_2$ on a backhaul link $215_3$. In transmissions in which a DU communicates on access and backhaul links, the traffic can be integrated, for example, using multiplexing and multiple access schemes (described below).

In example embodiments of the subject application, the backhaul communications between donor units (e.g., between donor DU 210 and relay DU $212_1$) and the access communications between user equipment (UEs $102_{1-N}$) and donor units (e.g., between donor DU 210 and UE $102_2$), can be integrated (e.g., multiplexed), resulting in an IAB link. The transmissions can be multiplexed so as to avoid interference. Some example transmission schemes integrating access and backhaul transmissions are described further below.

The network interface (e.g., communications interface) between the CU 205 and donor DU 210 can be referred to as the F1 (or F1-U) interface 250 (e.g., per 3GPP specifications).

Still referring to FIG. 2, the CU 205 can be operable to communicate with a core 260 (e.g., core network CN, evolved packet core (EPC)), via for example, a fiber interface. The core can serve as the interface for connection to networks such as the internet, corporate private networks, IP multimedia subsystems, etc. (e.g., one or more communication service provider networks).

Figure 3:
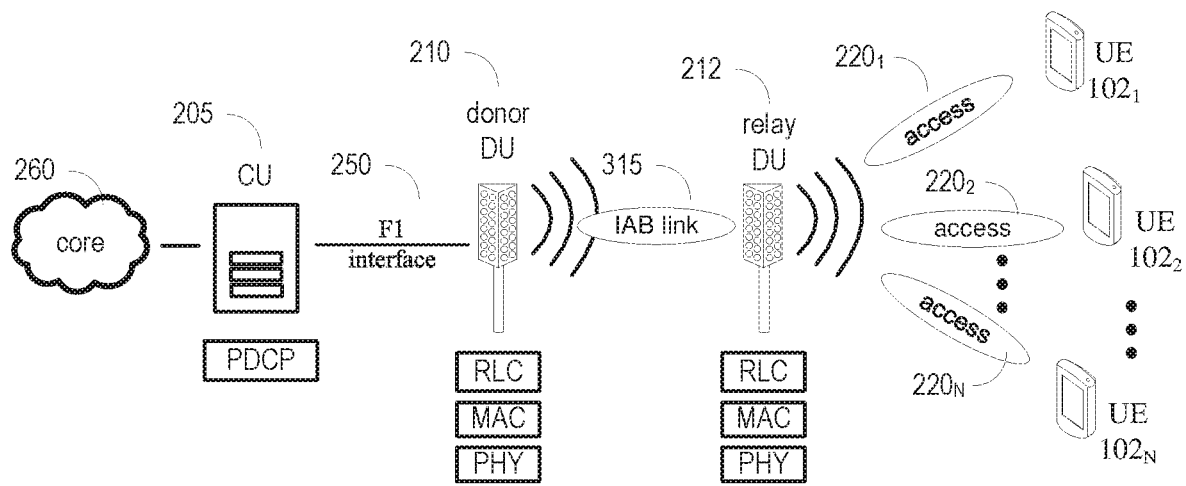
FIG. 3 illustrates an example wireless communication system depicting an integrated access and backhaul (IAB) link, in accordance with various aspects and example embodiments of the subject application.

FIG. 3 shows another example illustration wherein the multiplexed access and backhaul transmissions are represented with IAB link 315, wherein a DU (e.g., donor DU 210, relay DU 212) can multiplex data via access and backhaul links in time, frequency, or space (e.g. beam-based operation) to communicate with other DUs (e.g., relay DU 212), or with UEs. Here, the relay DU 212 also communicates with the donor DU 210, as well as with the UEs (e.g., UEs $102_{1-N}$). The IAB link 315 between the donor DU 210 and the relay DU 212 can carry user plane and control plane data for all the UEs $102_{1-N}$ being served by the relay DU 212. Hence, the IAB link 315 multiplexes packets to/from multiple different bearers serving the UEs $102_{1-N}$ that are being served by the relay DU 212, along with packets to/from the donor DU 210. Thus, the IAB link 315 can comprise integrated access traffic between the donor DU 210 and UEs $102_{1-N}$, integrated access traffic between the relay DU 212 and the UEs $102_{1-N}$, and integrated backhaul traffic between the donor DU 210 and the relay DU 212. Again, as noted above, the same spectrum is being used for both backhaul and access links, and as such, an IAB link can employ different multiplexing schemes to allow for uplink (UL) and downlink (DL) transmissions using the backhaul and access links (these schemes are described further below).

In the example architecture shown in FIG. 3, on the user plane, the Packet Data Convergence Protocol (PDCP) sublayers can reside at the CU 205, while the radio link control (RLC), media access control (MAC), and PHY layers can reside at the distributed units (e.g., donor DU 210, relay DU 212). As is known in the art, the PDCP layer, part of LTE layer 2 protocols, can be responsible for compression of the IP header of user-plane data packets (e.g., using the robust header compression (RoHC) protocol) to reduce the number of bits transmitting over the radio interface, ciphering and integrity protection of RRC messages, in-sequence delivery and retransmission of PDCP service data units (SDUs), and duplicate detection. The RLC layer is responsible for segmentation, concatenation, ARQ retransmission (e.g., error correction through automatic repeat request (ARQ)) and in-sequence delivery to higher layers. The media access control MAC layer is responsible for multiplexing of RLC protocol data units, HARQ retransmission (e.g., error correction through HARQ), scheduling for UL and DL, logical channel prioritization, etc. The physical layer (PHY) layer is responsible for coding/decoding, modulation/demodulation, multi-antenna processing, and mapping of signals to the appropriate physical time-frequency resources. Mapping of transport channels to physical channels is also handled at the PHY layer.

Figure 4:
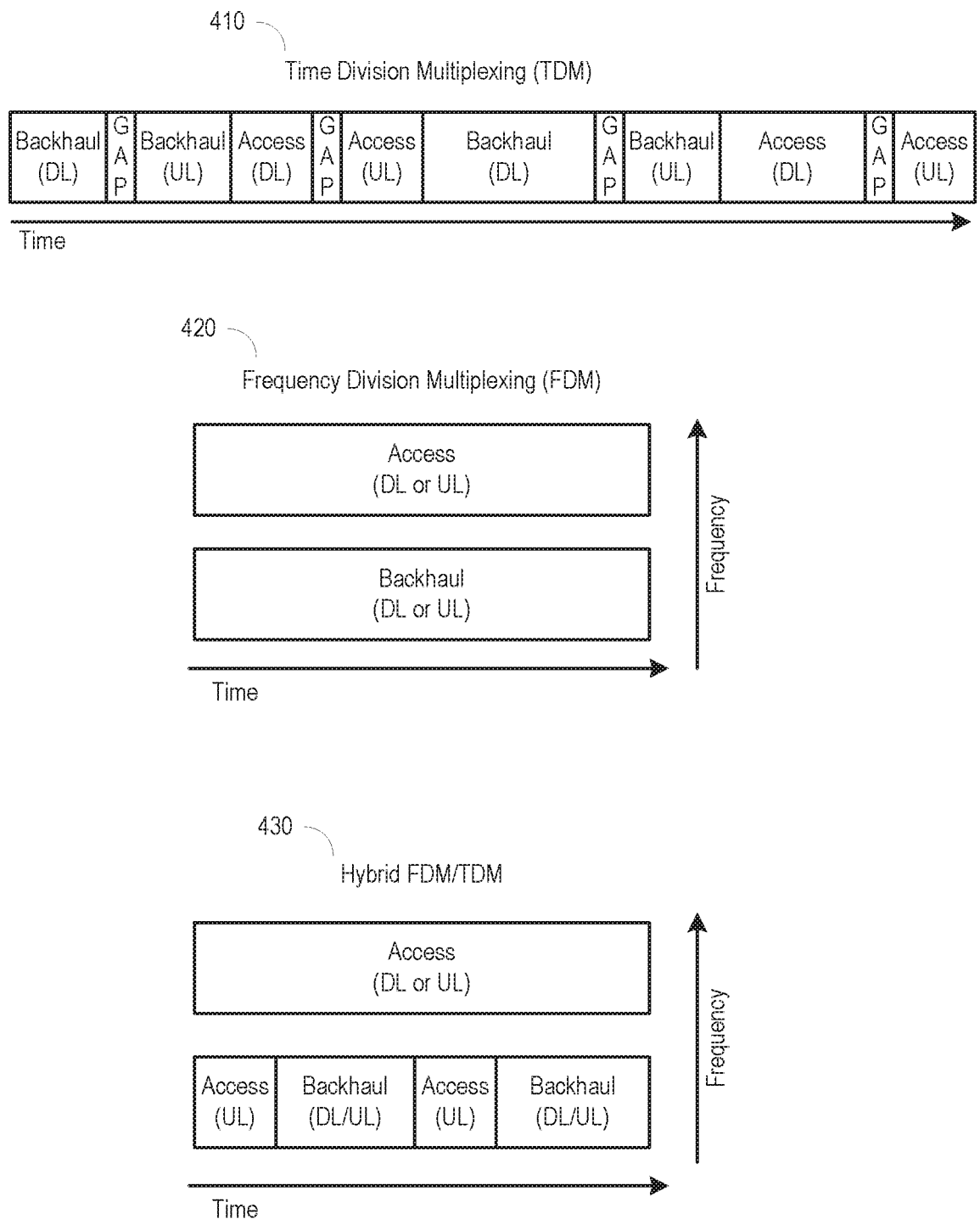
FIG. 4 illustrates examples of multiplexing schemes for IAB transmissions, in accordance with various aspects and example embodiments of the subject application.

FIG. 4 shows examples of transmissions employing time division multiplexing (TDM) 410, frequency division multiplexing (FDM) 420, and hybrid FDM/TDM 430 to integrate access and backhaul link transmissions. In the example transaction illustrating TDM 410, backhaul downlink (e.g., backhaul DL), backhaul uplink (e.g., backhaul UL), access downlink (e.g., access DL), and access uplink (e.g., access UL) transmissions can occur at different times on the same frequency (guard intervals in between transmission slots can also be employed, denoted by the label GAP). Frequency division multiplexing (FDM) 420 schemes can also be employed, whereby UL and DL transmissions on the access link are made on one frequency, and UL and DL transmissions on the backhaul link are made on another frequency, thereby allowing the transmissions to occur at the same time. Still referring to FIG. 4, in the example illustrating hybrid FDM/TDM 430, UL and DL access transmissions can be transmitted on one frequency, while other access and backhaul UL and DL transmissions with assigned time slots are transmitted on another frequency.

In addition to time and frequency, in 5G, the transmissions can also be multiplexed in space (e.g., spatial-division multiplexing (SDM)). Time-frequency-spatial layers can be used as a dynamic radio-frequency (RF) resource grid, instead of time-frequency only as a resource grid. The addition of the spatial layer as a multi-user resource is an important component of 5G that is enabled with techniques such as full dimension MIMO (FD-MIMO) or massive MIMO. The introduction of this spatial layer as a multi-user resource allows a DU simultaneously communicate with a UE on the access and another DU (mmW or macro cell) on the backhaul (self backhauling) using the same spectrum. Beamforming and directional transmissions can allow for transmissions in the same frequency and time, but directed spatially in a different direction or magnitude, so as to reduce interference. The spatial multiplexing can further be divided into the two following cases: a) intra-panel SDM, wherein the access and backhaul links use the same panel but different spatial layers, and b) inter-panel SDM, wherein the access and backhaul links use different panels. In example embodiments, the power control management system and methods disclosed herein can be applicable to various cases of access and backhaul multiplexing schemes.

Figure 5:
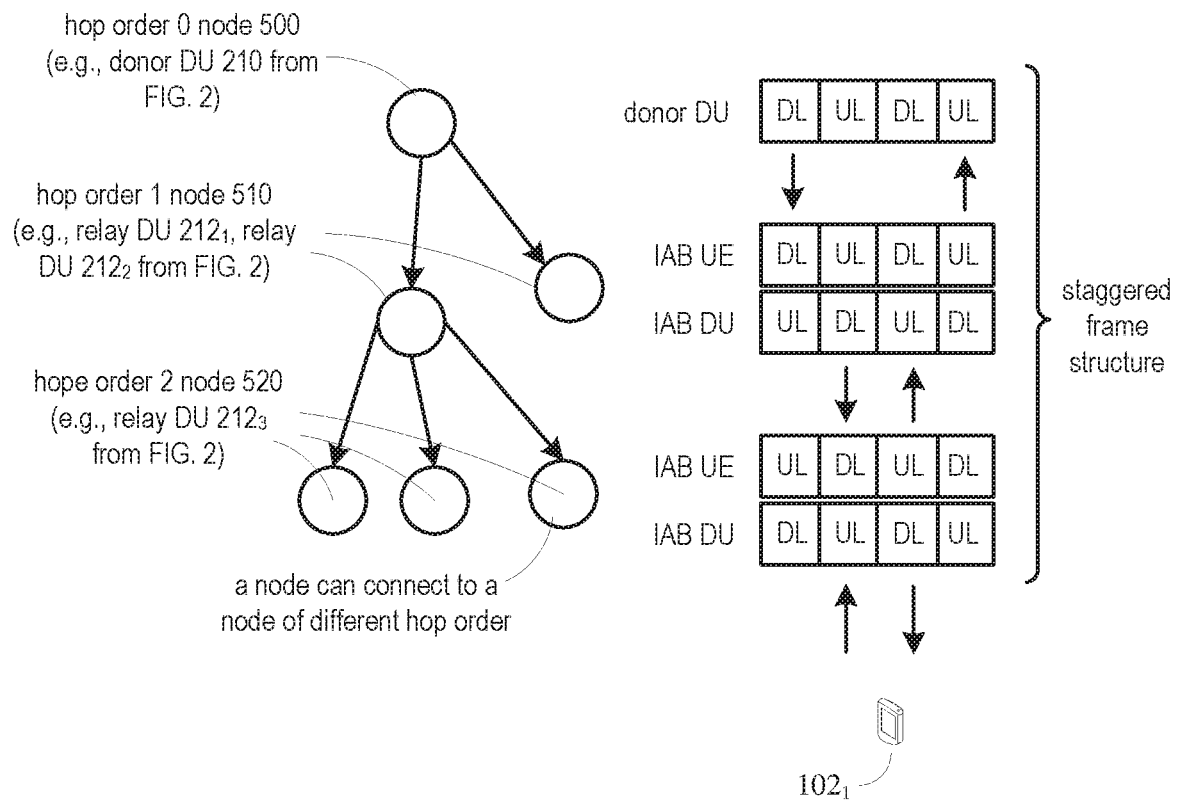
FIG. 5 illustrates a tree diagram depicting an example of DUs having different hop orders, and corresponding frame structures for IAB transmissions, in accordance with various aspects and example embodiments of the subject application.

Referring now to FIG. 5 provides an illustration of multi-hop backhauling and multi-site connectivity, and the multiplexing between DUs of different "hop orders." Since the coverage for some cells can be very small, and some DUs can be farther away, a multi-hop capability in which, for example, a mmWave relay DU might relay to another relay DU farther away, can be conducive to the functionality and efficiency of a next generation network. The hop order (e.g., node order) of a node (e.g., donor DU or relay DU) indicates the number of hops it is away from a donor node. FIG. 5 shows the topology of a network as a relational graph based on edges and nodes, wherein each circle represents a node. In FIG. 5, hop order 0 node 500 is of hop order 0, can comprises a donor node. Hop order 1 node 510 is of hop order 1 (e.g., one hop away from hop order 0 node 500), and hop order 2 node 520 is of hop order 2 (e.g., 2 hops away from hop order 0 node 500). In context of the example illustrated in FIG. 2, an example of hop order 0 node 500 would be donor DU 210. An example of hope order 1 node 510 would be relay DU $212_1$ and relay DU $212_2$, both one hope away from donor DU 210. An example of hop order 2 node 520 would be relay DU $212_3$, which is two hops away from donor DU 210. Thus, an DU can have more one or more DUs between the DU and the donor node, and each node can connect to multiple nodes in different hop orders.

Figure 6:
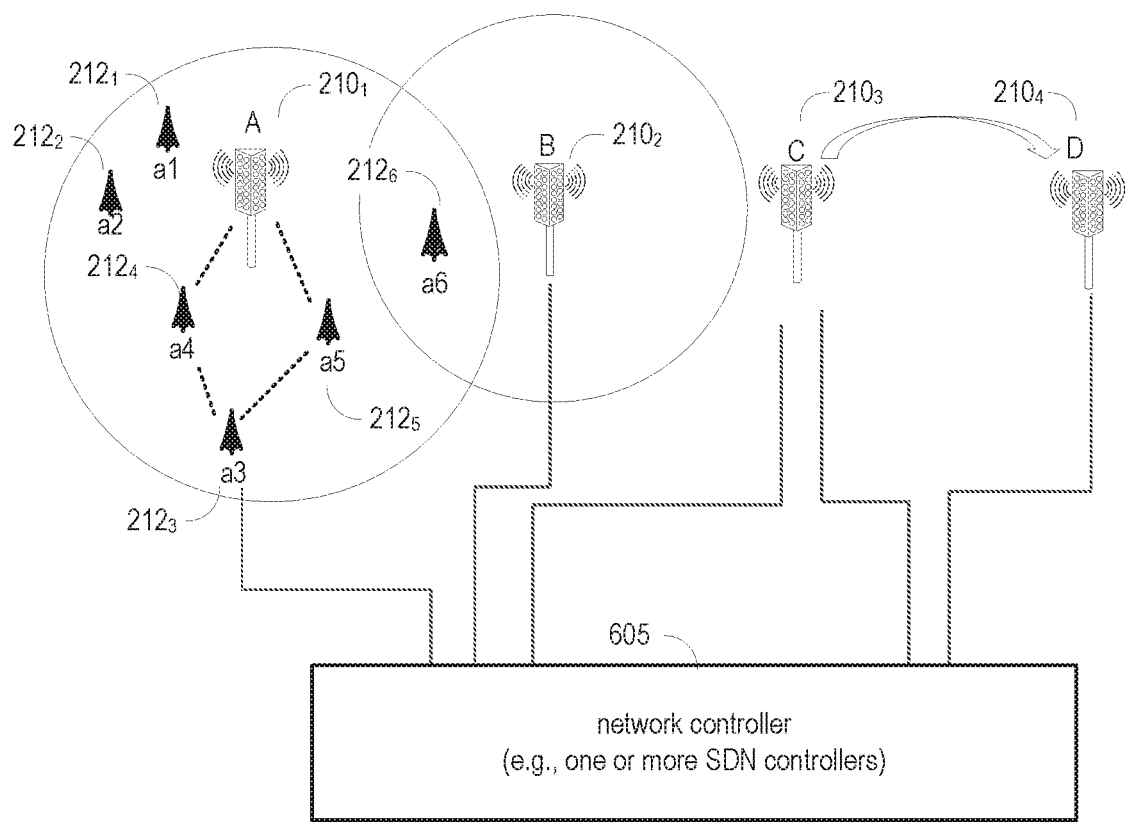
FIG. 6 illustrates an example wireless communication system having a network controller, in accordance with various aspects and example embodiments of the subject application.

Still referring to FIG. 5, due to the half-duplex constraint at each relay DU, the relay DU can transmit or receive at any given instance, but not both. The UE can be in receive mode during a backhaul DL allocation and in transmit mode during a backhaul UL allocation. Similarly, the DU can be in receive mode during an access UL allocation and in transmit mode during an access DL allocation. This implies that the frame structure across multiple hops can be staggered, as shown in FIG. 6. Based on the half duplex constraint when the access and backhaul are multiplexed at the same time (e.g., FDM or SDM) then the following combinations can result: PHY receive: backhaul DL and access UL are FDM or SDM; PHY transmit: backhaul UL and access DL are FDM or SDM.

Moving to FIG. 6, the upcoming 5G access network can also employ an architecture having a distributed core network (CN), which can comprise the CU 205 and the core 260. In a distributed CN, the user plane and control plane are separated, wherein complex control plane functions are abstracted from forwarding elements, simplifying user plane operations by relocating control logic to physical or virtual servers. Each plane carries a different type of traffic and can be implemented as overlay networks that runs independently on top of another one, although supported by the same physical infrastructure. The user plane (sometimes known as the data plane, forwarding plane, carrier plane, or bearer plane) carries the network user traffic, and the control plane carries signaling traffic. In example embodiments, the planes can be implemented in the firmware of routers and switches. User plane data is carried on data radio bearers (DRBs) that traverse the above described user plane RAN protocol architecture. On the control plane, signaling radio bearers (SRBs) are set up that carry control messages from the RRC layer also utilize the PDCP layer at the CU, and are further carried down through the RLC, MAC, and PHY layers at the DUs to be delivered to the UEs via access links over the air interface. Each UE 102 can be allocated multiple DRBs and SRBs by the network.

As an example of the separation of user and control plane in a distributed CN, a serving gateway S-GW in a centralized CN can in a distributed CN environment be separated into a S-GW-C for the control plane and S-GW-U for the user plane, wherein the user plane functionality is closer to the network edge. Likewise, as shown in a Packet Data Network (PDN) gateway (P-GW) can be separated into a P-GW-C for the control plane, and a P-GW-U for the user plane, with the S-GW-U and P-GW-U functionality being moved closer to the edge of the network. In such a distributed CN environment, the physical core can be virtually separated and relocated in the network into multiple virtual core networks using virtualization technology. This software-defined networking (SDN) approach, can be complimentary to a network functions virtualization (NFV) approach, in which a virtual network function (VNF) is responsible for handling specific network functions (NFs) that run on one or more virtual machines (VMs) on top of the hardware networking infrastructure (e.g., routers, switches, etc.). Individual VNFs can be connected or combined to offer a particular network communication service. Both SDN and VNF can facilitate the IAB partitioning and routing functions as described below.

Referring to FIG. 6, a mobile network 106 in accordance with various aspects and embodiments of the subject application can implement an emergency responders communication network (ERCN) that can carry emergency responder communications (e.g., ERCN traffic, such as ERCN data, ERCN messages, ERCN email, ERCN voice data, ERCN alerts, ERCN broadcast message and alerts, ERCN video data, etc.). This can be implemented, for example, using a network slice that provides emergency communication services for first responder entities, and devices used by first responder entities and their personnel. An example of such an ERCN is FirstNet, an ongoing implementation of an emergency network sponsored by the U.S. federal government that serves first responders such as police, fire, and EMS personnel, and puts advanced technologies, applications, and devices in the hands of first responders so that they can more effectively provide public safety services. Such an ERCN can provide first responders with the coverage, capacity, cybersecurity, interoperability, and quality of service (QoS) they need to share information to facilitate the performance of their jobs. As such, a mobile network that carries ERCN traffic should facilitate delivery of this traffic. Not only is emergency communication traffic important, it has significant different traffic characteristics (e.g. a significant amount of multicast traffic) than other communication services.

In accordance with various aspects and example embodiments of the subject application, there is provided a network controller that enables the dynamic optimization of access/backhaul partitioning in an IAB link, when triggered by an ERCN event, as well as the dynamic backhaul routing optimization for ERCN data. These operations can be implemented with centralized, distributed, or a hybrid control entity. In example embodiments of the subject application, a network controller can perform these operations.

FIG. 6 shows an example mobile radio access network (RAN) in which a network controller 605 (e.g., one or more network controllers performing one or more functions, which can be virtual functions) can manage several macrosites having donor DUs (e.g., donor DU $210_{1-4}$ labeled "A"

through "D," respectively, and manage several metrosites comprising relay DUs (e.g., relay DUs $212_{1-6}$, labeled "a1" to "a6," respectively. As shown in FIG. 6, while there can be many implementations of a network controller, in example embodiments, an SDN controller can be used. An SDN controller comprises an application in software defined networking (SDN) that can manage flow control to enable intelligent networking. SDN controllers are based on protocols (e.g., such as OpenFlow) that allow servers to tell switches where to send packets of network traffic. Implementation with an SDN controller can leverage the concept of the separation of the control plane from user plane. Since use of an SDN controller can result in improved programmability, great flexibility, and separation between control and forwarding, an SDN controller can provide for the operations of 1) access/backhaul (e.g., IAB) partitioning and 2) route optimization based on, for example, an ERCN event (which generates ERCN traffic), operator policies, and network conditions. The IAB partitioning (e.g., facilitating an adjustment to a partition of an IAB link) and routing will be described further below.

Figure 7:
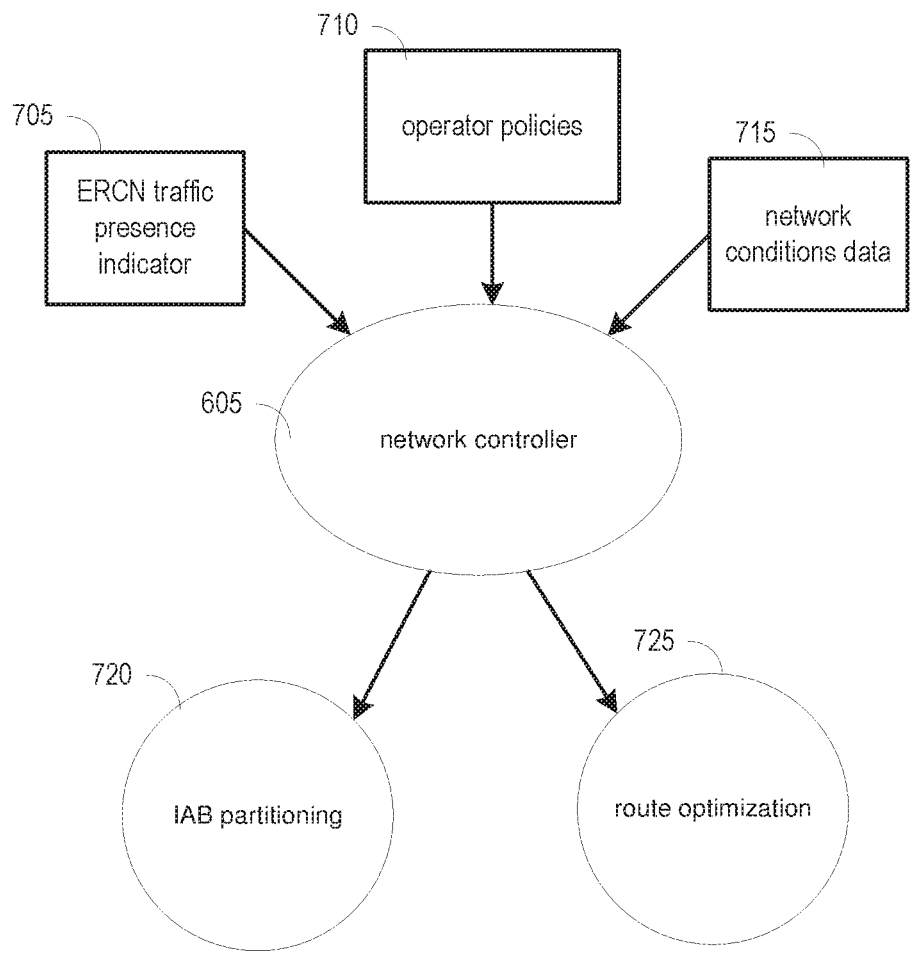
FIG. 7 illustrates an example diagram showing a network controller operable to facilitate management of an IAB communication link partition, and facilitate route optimization of backhaul communications, in accordance with various aspects and example embodiments of the subject application.

Moving to FIG. 7, a block diagram illustrating the functioning of a network controller 605 is shown. A network controller 605 can consider as input information, a ERCN traffic presence indicator 705, operator policies 710, and network conditions data 715. Based on an analysis of this information, the network controller 605 can guide and facilitate IAB partitioning 720, and route optimization 725.

The network controller 605 (e.g., which can be one or more network controllers) can be operable to determine the presence of ERCN traffic on the network (e.g., using an ERCN traffic presence indicator 705). ERCN traffic can be present can be present, for example, anytime an emergency condition arises, or an emergency event occurs (e.g., from smaller events like traffic accidents to larger events like natural disasters and terroristic attacks). To determine the presence of ERCN traffic (at a DU, for example), the network controller can examine incoming network traffic packets for the presence of an identifier, or indicator (provided by a DU, for example) that the network communication traffic comprises an emergency communication (e.g., emergency responder communication). The indicator (e.g., ERCN traffic presence indicator 705) can be a data element, a bit in a frame, sequence of characters, etc., that indicates whether the traffic at the DU relates to ERCN traffic. An indicator that identifies traffic as ERCN traffic, can be, for numeric. For example, a "0" in the frame corresponding to ERCN traffic indication can indicate the absence of ERCN traffic. A "1" can mean that the ERCN traffic is the only traffic on the network, or that particular segment of the network. A "2" value can indicate the presence of both ERCN and regular services on the network.

Still referring to FIG. 7, in example embodiments in accordance with aspects of the present application, the network controller 605 can obtain access to operator policies 710 related to the delivery of ERCN data, as well as other policies. The policies can be, for example, provisioning policies such as a subscriber level agreement (SLA), smart billing (dedicated services can be charged differently when a super slice is used, depending on the supply and demand of the super slice and its capacity and availability), related to not only the ERCN data, but other, regular non-ERCN data as well (e.g., other subscriber traffic (e.g., generated by customer entity or customer identity devices). This information can enable the network controller 605 to make decisions regarding which traffic to prioritize. For example, the ERCN's designated level of service (e.g., based on its bandwidth requirements, quality of service (QoS), class of service, etc.) can take priority over that of other data packets. As for non-ERCN traffic, packets associated with premium services, or premium level SLAs, can take priority over regular traffic that is non-premium services. These packets can have a different bandwidth, class of service, quality of service, etc., associated with them. The prioritization of the traffic can inform the network controller in its performance of IAB link partitioning operations and also its performance of route optimization operations (described further below).

The network controller 605, in performing its IAB partitioning and route optimization functions, can receive input regarding network conditions (e.g., network conditions data 715), and analyze the network condition information. The network conditions data 715 can comprise DU (e.g., TRP) information and dynamic conditions. Network conditions data 715 can comprise, for example, information regarding the type (e.g., profile) of the DU. For example, the radio access technology used by the DU (e.g., LTE or 5G), the frequency band it operates in (e.g., band x or band y, where "x" is a particular frequency range, and "y" is a particular frequency range), the classification of the DU (e.g., whether it is a millimeter wave (mmW) relay, or metrosite relay DU, or macrosite donor DU), its total operating bandwidth, and the amount of output power generated by the DU (e.g., 1 megawatt (mW), 5 mW), to name a few. The network conditions data 715 can comprise the access/backhaul partition (e.g., 50 Mhz for access transmissions, 50 Mhz for backhaul transmissions), the current access load (e.g., 40%), the wireless backhaul link between a donor DU and relay DUs (e.g., a1→A from FIG. 6 describes the route between relay DU a1 and donor DU A. The network conditions data 715 can comprise the backhaul characteristics, for example, the type of access (e.g., fiber, 10G, etc.), the bandwidth of the backhaul link (e.g., 50 Mhz, 20 Mhz, etc.). More examples of network conditions data 715 are described below.

Figure 8:
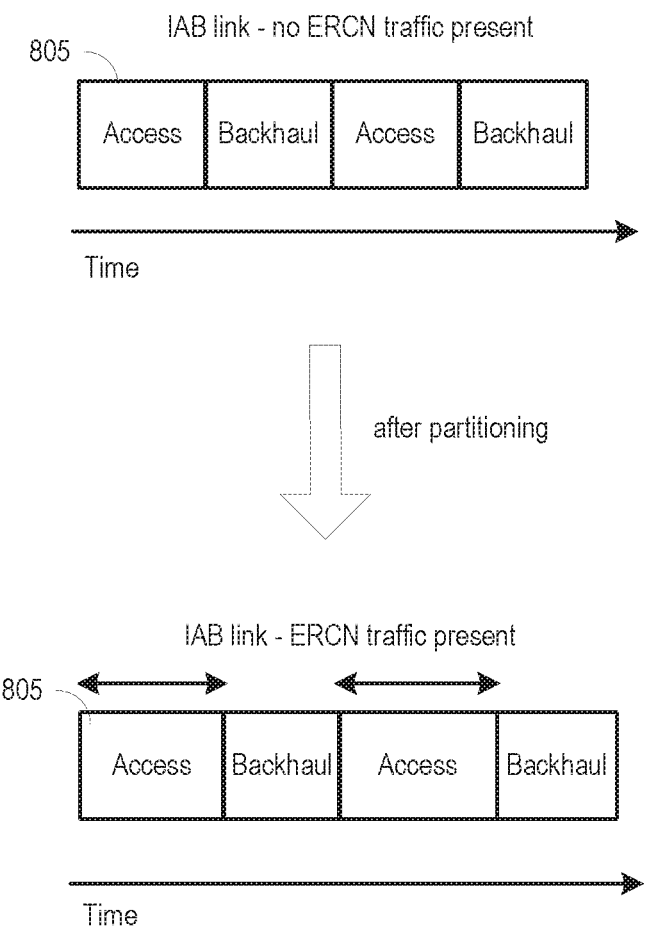
FIG. 8 illustrates an example of management of an IAB link partition, in accordance with various aspects and example embodiments of the subject application.

FIG. 8 illustrates an example of an IAB partitioning operation (e.g., function, task, etc.) in which access/backhaul resources can be allocated differently (e.g., adjusted from normal delivery) to prioritize ERCN traffic. In the top graph of FIG. 8, during normal operation in which there is no ERCN traffic presence, the partition of access and back can be 50/50 (e.g., 50 megahertz (Mhz) access, 50 Mhz backhaul). Of note, these are the transmission slots that care allocated for access and backhaul, but the access load might still be, for example, 60%. That is, even though bandwidth has been allocated 50/50, more access traffic is on the link. As an example, if access traffic becomes loaded and the backhaul links are less utilized, the network controller 605 can partition the IAB link by re-allocating the bandwidth allocated for access traffic to increase the allotted bandwidth for access traffic, while reducing the allocated bandwidth for backhaul transmissions. As shown in FIG. 8, an access transmission slot 805 for access transmissions (multiplexed with backhaul transmissions), can be increased, after partitioning, so that the transmission slot's bandwidth is increased relative to its original bandwidth. The bandwidth of the backhaul time slots, conversely can decrease. As another example, the number of access time slots can also be increased (e.g., two access slots for every one backhaul slot). In the opposite scenario, if backhaul traffic is heavy, then the partitioning can adjust so that more bandwidth is allocated for backhaul traffic, and the frequency of transmissions of backhaul slots can also be adjusted.

Thus, facilitating an adjustment to the IAB link partition can comprise facilitating changing an amount of the first bandwidth. The facilitating an adjustment can comprise facilitating changing an amount of the second bandwidth. The adjustment can comprise facilitating a change in a frequency of transmission of time slots allocated for transmissions on the access communication link. The adjustment can comprise facilitating a change in a frequency of transmission of time slots allocated for transmissions on the backhaul communication link. The facilitating can be performed, for example, by a network controller (e.g., network controller 605). The network controller can consider information, such as network conditions data (e.g., network conditions data 715), as well as one or more operator policies (operator policies 710). This information can be used in an algorithm that can, for example, weigh one or more pieces of information to determine whether an adjustment to the IAB partition can be more desirable. As an example, if it is determined (e.g., by network controller 605) that a ERCN traffic presence indicator is present, and a large percentage of the ERCN traffic on a IAB link (e.g., IAB link 315) comprises access traffic, and the amount of bandwidth allocated to access traffic at a particular node (or on a particular link) is 20 Mhz, while the amount of bandwidth allocated for backhaul communications is 80 Mhz, the network controller might adjust the IAB partition such that more bandwidth is allocated for access communications. It can, for example, increase the amount of access traffic on the IAB link to 60 Mhz, while reducing the bandwidth allocated for backhaul communications on the IAB link to 40 Mz.

In example embodiments in accordance with the present application, the dynamic partitioning of the resources between access and backhaul can be controlled (e.g., facilitated) by the network controller, but can be performed at the scheduler, which makes the dynamic partitioning possible. A scheduler can, for example, be operable to determine resource assignments for transmissions between UEs and DUs, and between the donor DU and the relay DU. The scheduler can assign network resources based upon numerous criteria (e.g., base station throughput, user latency, amount of packets waiting at buffer, fairness, etc.). Depending on factors and conditions (e.g., condition of the channels, number of DUs, number of UEs in a cell, access utilization, backhaul utilization, etc.), the schedulers of the DUs can be operative to select from a variety of multiplexing schemes that can integrate the transmission of the backhaul links and access links. In order to perform these operations in a scheduler, a mechanism for relaying scheduling metrics (or benefit metrics) from the centralized controller (e.g., network controller 605) to the DU can be used.

With respect to route optimization, the network controller 605 can facilitate the routing of data through DUs in a manner that prioritizes the delivery of ERCN traffic. As an example, it might divert traffic away from a relay DU that has, for example, poorer transmission channel quality (e.g., obstructed transmissions, etc.). For example, as shown in FIG. 6, backhaul traffic from relay DU 212$_3$ (a3) to donor DU 210$_1$ might have had its route changed from going through relay DU 212$_4$ (a4) to relay DU 212$_5$ (a5) if the network condition information regarding relay DU 212$_4$ shows that its channel condition is poor. As another example, the network controller 605 can select a route that reduces the number of hops for traffic packets to get from a donor DU to a relay DU, by routing the ERCN traffic through 3 relay DUs versus, say 5 relay DUs.

FIG. 9 and FIG. 10 provide charts comprising various information, or data, relating to network conditions (e.g., network conditions data 715). The difference in some of the network conditions data presented in FIG. 9 versus FIG. 10 shows how the partition for the IAB link can be changed (e.g., as facilitated by a network controller, e.g., network controller 605) based on the presence of ERCN traffic.

Network conditions data can comprise, for example, the protocol that a DU employs (e.g., LTE, 5G). Network conditions data can also provide, for example, a frequency range (for example, a frequency band, such as band x, or band y, wherein x and y represent a value, or a specific range) associated with a DU. Network conditions data can also comprise, for example, the width of the spectrum associated with the DU. Network conditions data can also comprise, for example, the type of site for the DU, such as whether it is macrosite or metrosite. Network conditions data can also comprise whether the DU is operating in the millimeter wave (e.g., with a designation "mmW").

Network conditions data can comprise information about the IAB partition (e.g., access/backhaul partition), such as the amount of bandwidth allocated for access transmissions, and the amount of bandwidth allocated for backhaul transmissions, of a particular IAB link (e.g., IAB link 315). For example, a displayed designation for the IAB partition being 50 Mhz/50 Mhz can indicate that 50 Mhz is the bandwidth allocated for access traffic, and 50 Mhz is the bandwidth allocated for backhaul traffic. The IAB partition can also be expressed, for example in terms of percentage of the bandwidth of the IAB link taken up access, or backhaul (e.g., 50%/50%).

Network conditions data can also comprise information regarding the percentage of the IAB link's load access traffic, or the percentage of the load that is backhaul traffic (e.g., 40% of the load on the IAB link might be access traffic, or 60% of the load on the IAB link might be backhaul traffic). Network conditions data can also comprise the percentage of the load that is access traffic (or the percentage of the load that is backhaul traffic), passing through a DU (e.g., 40% of the traffic passing through the DU is access traffic, or 60% of the traffic passing through the DU is backhaul traffic).

The network conditions data can also comprise data regarding the backhaul link characteristics, such as, for example, whether it is fiber, 10G link, etc. The backhaul link characteristics can be information about the type of protocol (5G, LTE), whether it is millimeter wave, what frequency band it operates in (e.g., band x, band y), the width of the frequency band, etc.

The network conditions data can also comprise data regarding a channel condition of a particular link between one DU and another (e.g., poor condition, good condition, excellent condition, etc.), which can be expressed as a value (e.g., 1 for excellent, 2 for good, 3 for fair, 4 for poor, etc.).

Referring to FIG. 9, an example network conditions table 900 is shown to provide an illustration of some of the relevant network condition data associated with DUs when there is no ERCN traffic with respect to each node. Not all entries in this table are filled, as the table provides examples. Network conditions table 900 can show the DU's identity 905 (e.g., which DU is involved), ERCN traffic presence 910 (e.g., whether ERCN traffic is being carried by the DU), the DU's profile 915, access/backhaul partition 920 (e.g., the current IAB partition), the access load percentage 925, the backhaul link 930 (which identifies links to a donor DU), backhaul link characteristics 935, backhaul load percentage 940, and channel condition 945 of the link.

As can be seen in network conditions table 900, donor DU A (e.g., donor DU 210$_1$ from FIG. 6) is an LTE capable DU, operating on band x, and is a donor DU (at a macrosite). Additionally, 40% of its load is access traffic. Donor DU A, being a donor, has no links to itself. Its backhaul link characteristic is comprised of Fiber, and 10G bandwidth. Each of the other relay DUs (e.g., relay DUs a1-a5 in network conditions table 900) also have network profile and network conditions information associated with them. Of note, in network conditions table 900, the access/backhaul partition for relay DU a2 is at 50 Mhz bandwidth for the access link, and 50 Mhz for the backhaul link, as shown in field 950.

FIG. 10, shows the network conditions table 900, but in FIG. 10, the ERCN presence column indicated the presence of ERCN traffic at several DUs. As mentioned above, a network controller (e.g., network controller 605) can facilitate adjustments to the access/backhaul (e.g., IAB) partition based on the presence of ERCN traffic presence indicator 705, operator policies 710, and network conditions data 715. In network conditions table 900 as shown in FIG. 10, the access/backhaul partition for relay DU a2 in field 1005 has changed from 50/50 Mhz in FIG. 9 to 40/60 Mhz in FIG. 10. As such, the IAB partition for traffic associated with node a2 has been adjusted to provide more bandwidth for backhaul communications.

Figure 11:
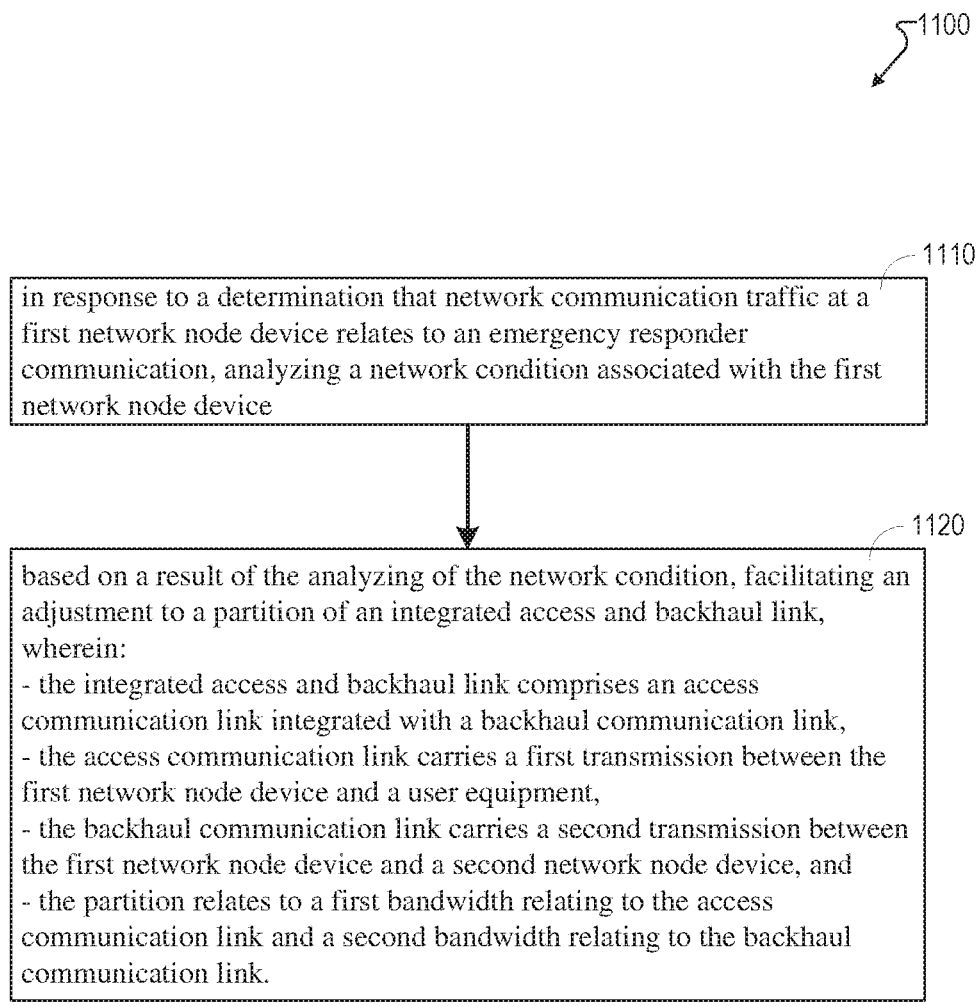
FIG. 11 illustrates an example method flow chart for managing IAB link partition, in accordance with various aspects and example embodiments of the subject application.
Figure 12:
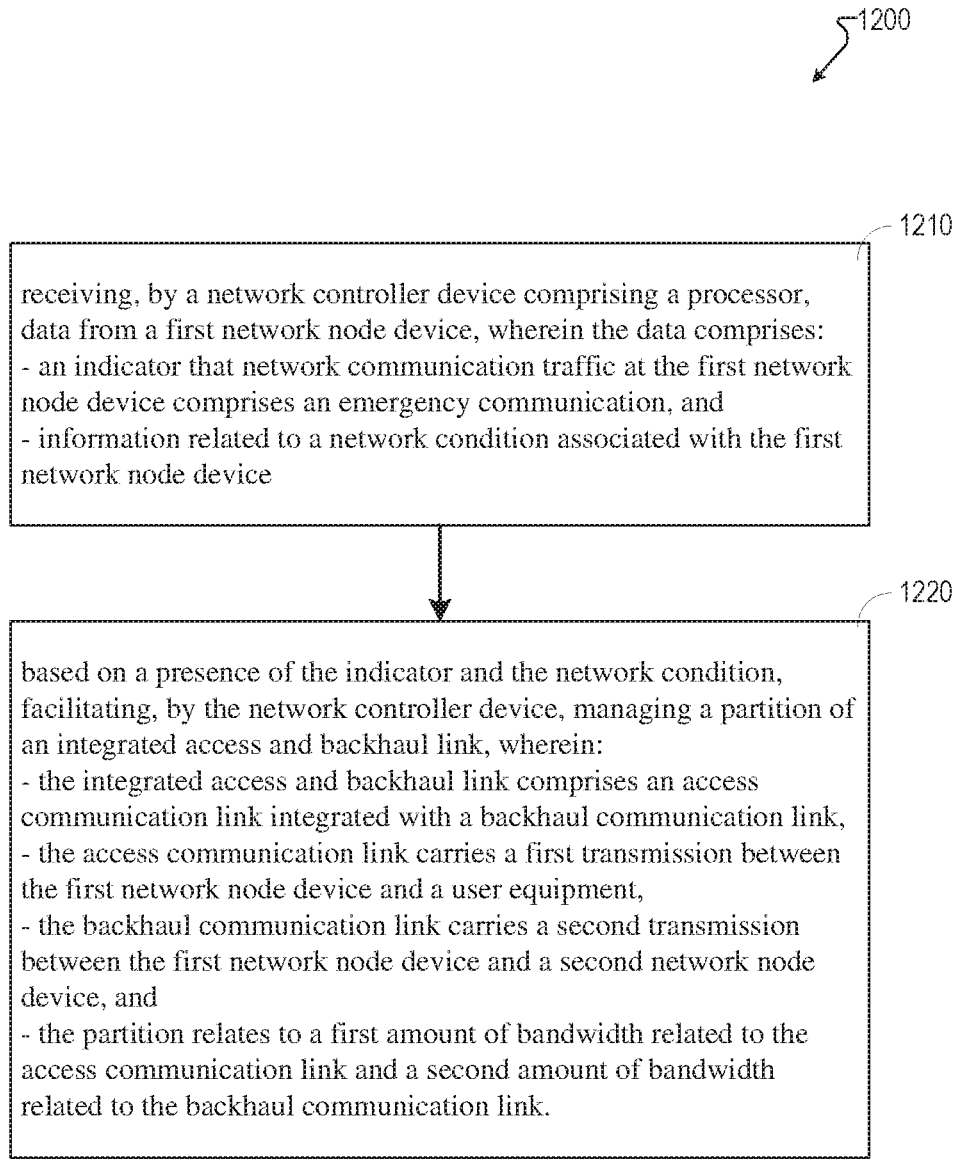
FIG. 12 illustrates another example method flow chart for managing IAB link partition, in accordance with various aspects and example embodiments of the subject application.
Figure 13:
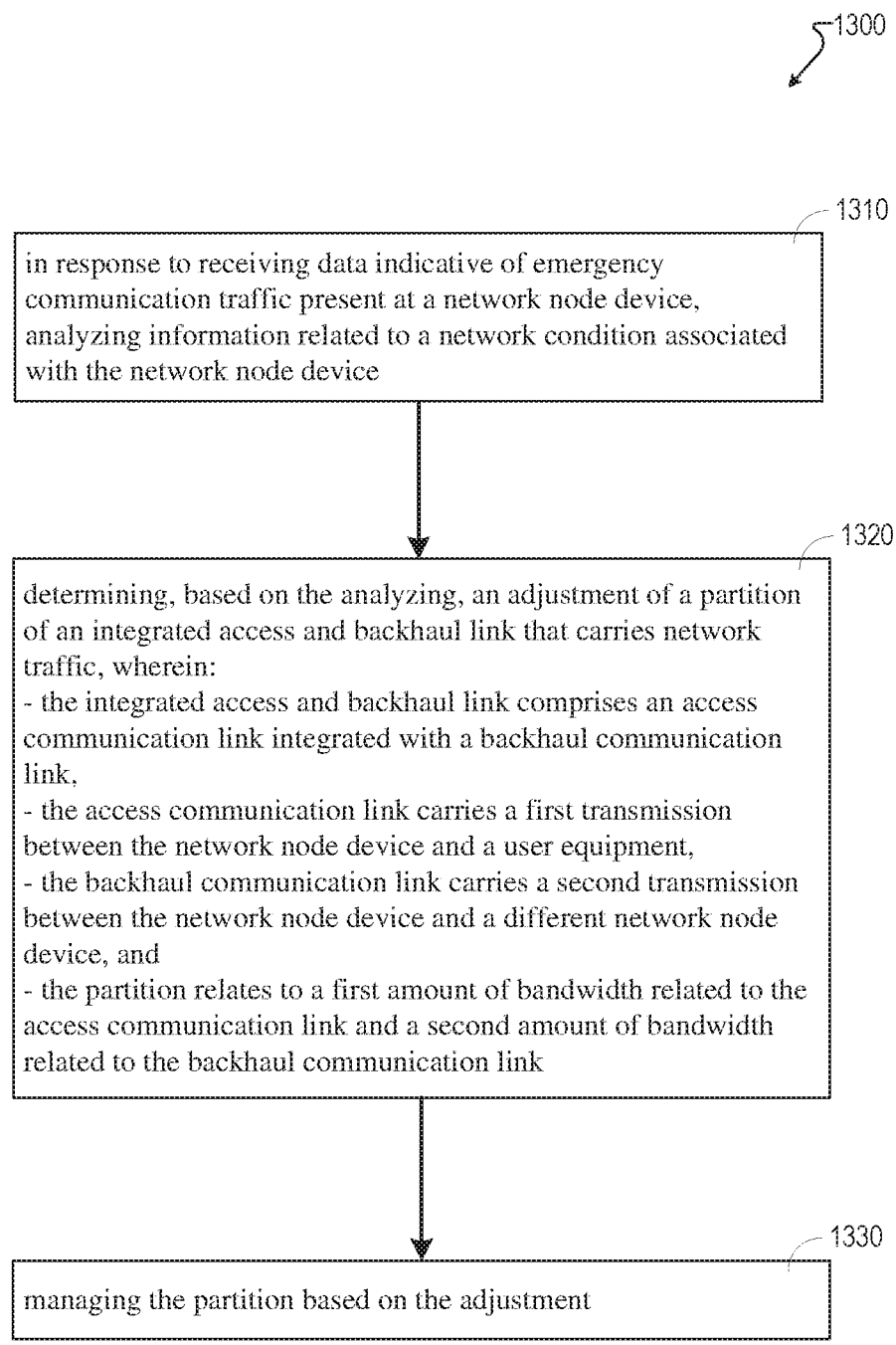
FIG. 13 illustrates another example method flow chart for managing IAB link partition, in accordance with various aspects and example embodiments of the subject application.

The methods and operations (e.g., processes and logic flows) described in this specification can be performed by one or more devices (e.g., a network controller 605, relay DUs, donor DUs, etc.) comprising one or more processors that execute computer executable instructions (e.g., computer program product, computer-readable instructions, software, software programs, software applications, software modules, etc.) that, when executed by a processor, facilitate performance of operations as described in FIGS. 11, 12, and 13. The computer executable instructions can be stored on, for example, a machine-readable storage medium.

FIG. 11 illustrates an example method for managing an IAB link partition, in accordance with various aspects and example embodiments of the subject application.

The method can comprise, at block 1110, analyzing a network condition (e.g., network conditions data 715) associated with a first network node device (e.g., network node 104) in response to a determination that network communication traffic at the first network node device relates to an emergency responder communication (e.g., ERCN traffic). The determination can comprises determining whether a data frame contains an indicator indicating a presence of the emergency responder communication (e.g., ERCN traffic presence indicator 705). The first network node device can comprises a transmit and receive point device (e.g., TRP) for transmission and reception of packets of information. The first network node device can comprise a distributed unit (DU) device (e.g., donor DU 210, relay DU 212).

The method can further comprise, at block 1120, based on a result of the analyzing of the network condition, facilitating an adjustment to a partition of an integrated access and backhaul link. The integrated access and backhaul link (e.g., IAB link 315) can comprise an access communication link (e.g., access link 220) integrated with a backhaul communication link (e.g., backhaul link 215). The access communication link can carry a first transmission between the first network node device and a user equipment (e.g., UE 102). The backhaul communication link can carry a second transmission between the first network node device and a second network node device. The first transmission and the second transmission can be multiplexed on the integrated access and backhaul link. The partition can relate to a first bandwidth relating to the access communication link and a second bandwidth relating to the backhaul communication link. The facilitating an adjustment can comprise facilitating changing an amount of the first bandwidth. The facilitating an adjustment can comprise facilitating changing an amount of the second bandwidth. The adjustment comprises facilitating a change in a frequency of transmission of time slots allocated for transmissions on the access communication link. The adjustment comprises facilitating a change in a frequency of transmission of time slots allocated for transmissions on the backhaul communication link.

FIG. 12 illustrates another example method for managing IAB link partition, in accordance with various aspects and example embodiments of the subject application.

The method can comprise, at block 1210, receiving, by a network controller device (e.g., network controller 605) comprising a processor, data from a first network node device (e.g., donor DUs $210_{1-N}$, relay DU $212_{1-N}$, etc.). The data can comprise an indicator that network communication traffic at the first network node device comprises an emergency communication (e.g., ERCN traffic presence indicator 705). The data can further comprise information related to a network condition (e.g., network conditions data 715) associated with the first network node device.

The method at block 1220 can further comprise, based on a presence of the indicator and the network condition, facilitating, by the network controller device, managing a partition of an integrated access and backhaul link (IAB link 315). The integrated access and backhaul link comprises an access communication link (e.g., access link 220) integrated with a backhaul communication link (e.g., backhaul link 215). The access communication link can carry a first transmission between the first network node device and a user equipment. The backhaul communication link can carry a second transmission between the first network node device and a second network node device. The partition can relate to a first amount of bandwidth related to the access communication link and a second amount of bandwidth related to the backhaul communication link.

The facilitating the managing of the integrated access and backhaul link can comprise facilitating re-routing a communication packet of the emergency communication from a first communication link (e.g., access link 220) to a second communication link (backhaul link 215) of the integrated access and backhaul link, based on the network condition. The network condition can comprise a first link condition associated with the access communication link and a second link condition associated with the backhaul communication link.

The method can further comprise determining, by the network controller device, a path to route the emergency communication. The determining the path can be based on a number of intervening network node devices (e.g., hops) between the first network node device and a destination device.

FIG. 13 illustrates another example method for managing IAB link partition, in accordance with various aspects and example embodiments of the subject application.

The method at block 1310 can comprise, in response to receiving data indicative of emergency communication traffic (e.g., ERCN traffic) present at a network node device (e.g., network node 104, donor DU 210, relay DU 212, etc.), analyzing information related to a network condition (e.g., network conditions data 715) associated with the network node device.

The method at block 1320 can comprise, determining, based on the analyzing, an adjustment of a partition of an integrated access and backhaul link (e.g., IAB link 315) that carries network traffic. The integrated access and backhaul link can comprise an access communication link (e.g., access link 220) integrated with a backhaul communication link (e.g., backhaul link 215). The access communication link can carry a first transmission between the network node device and a user equipment. The backhaul communication link can carry a second transmission between the network node device and a different network node device. The partition can relate to a first amount of bandwidth related to the access communication link and a second amount of bandwidth related to the backhaul communication link.

The method at block 1330 can comprise, managing the partition based on the adjustment. The operations can further comprise determining whether an operator policy (e.g., operator policies 710) is applicable to the adjustment of the partition. The operations can further comprise selecting a path to route the emergency communication, and wherein selecting the path considers a number of intervening network node devices (e.g., hops) between the network node device and a destination device. The selecting the path can also be based on the network condition, and can also be based upon the operator policy.

Figure 14:
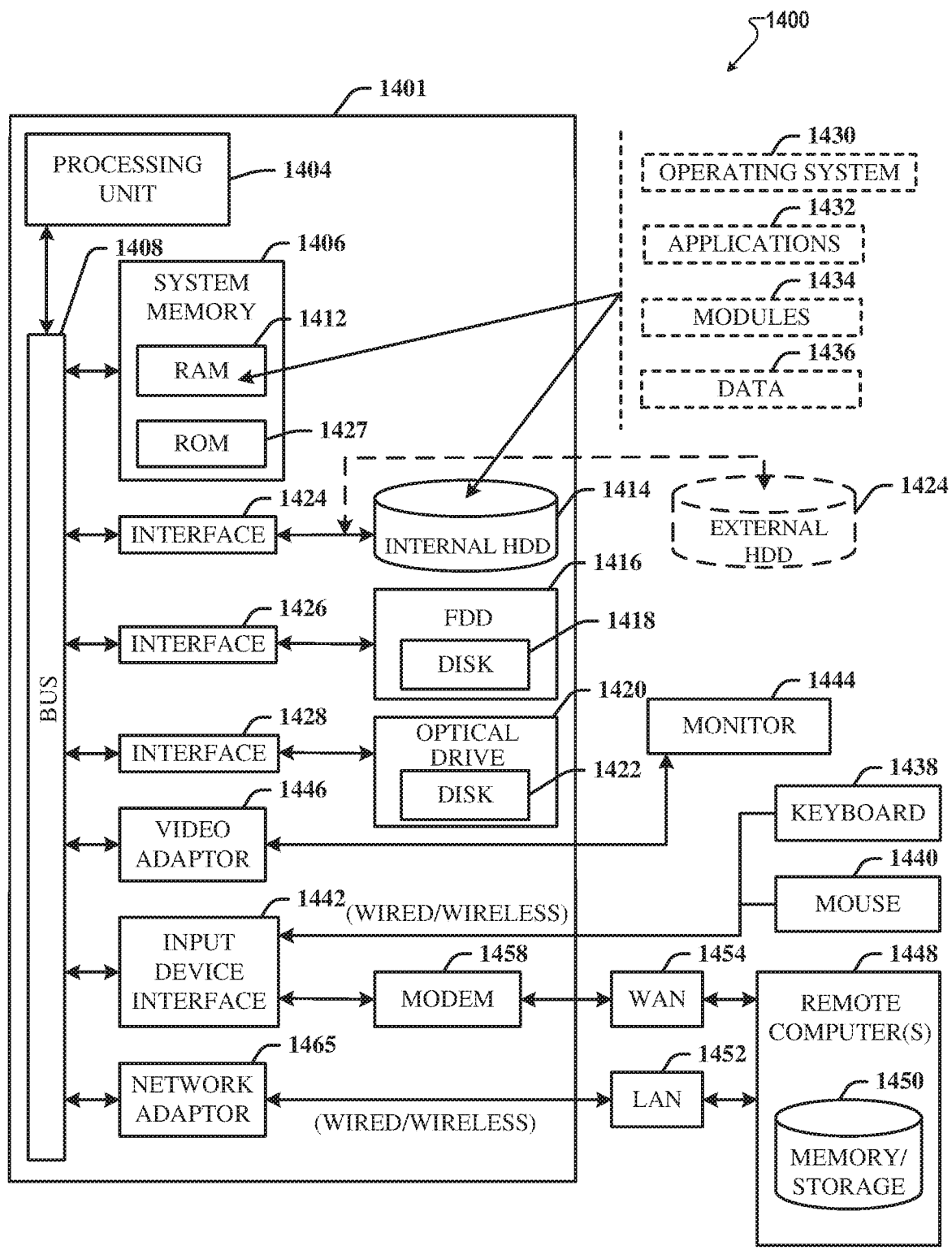
FIG. 14 illustrates an example block diagram of a computer that can be operable to execute processes and methods, in accordance with various aspects and embodiments of the subject application.

Moving now to FIG. 14, there is illustrated a block diagram of a computer 1400 that can be operable to execute the functions and operations performed in the described example embodiments. For example, a network controller, donor DUs, and relay DUs can contain circuitry and components as described in FIG. 14. The computer 1400 can provide networking and communication capabilities between a wired or wireless communication network and a server and/or communication device. In order to provide additional context for various aspects thereof, FIG. 14 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein, devices can include a computer 1400, the computer 1400 comprising a processing unit 1404, a system memory 1406 and a system bus 1408. The system bus 1408 couples system components comprising the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 comprises read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further comprises an internal hard disk drive (HDD) 1414 (e.g., EIDE, SATA), which internal hard disk drive 1414 can also be configured for external use in a suitable chassis (not shown), a magnetic floppy disk drive (BUD) 1416, (e.g., to read from or write to a removable diskette 1418) and an optical disk drive 1420, (e.g., reading a CD-ROM disk 1422 or, to read from or write to other high capacity optical media such as the DVD). The internal hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The hard disk drive interface 1424 for external drive implementations comprises at least one or both of Universal Serial Bus (USB) and IEEE 1294 interface technologies. Other external drive connection technologies are within contemplation of the subject embodiments.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1412, comprising an operating system 1430, one or more application programs 1432, other program modules 1434 and program data 1436. All or portions of the operating system, applications, modules, and/or data can also be cached in the RAM 1412. It is to be appreciated that the embodiments can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 2394 serial port, a game port, a USB port, an IR interface, etc.

A monitor 1444 or other type of display device is also connected to the system bus 1408 through an interface, such as a video adapter 1446. In addition to the monitor 1444, a computer 1400 typically comprises other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically comprises many, if not all of, the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the LAN 1452 through a wired and/or wireless communication network interface or adapter 1456. The adapter 1456 can facilitate wired or wireless communication to the LAN 1452, which can also include a wireless access point disposed thereon for communicating with the adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments can comprise a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B,"

"gNodeB," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations or embodiments, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Network equipment, comprising:
   a processor; and
   a memory that stores computer executable instructions that, when executed by the processor, facilitate performance of operations, comprising:
   analyzing a network condition associated with a first network node device using an integrated access and backhaul link, wherein the integrated access and backhaul link comprises an access communication link integrated with a backhaul communication link; and
   based on a result of the analyzing of the network condition, facilitating an adjustment to a partition of resources of the integrated access and backhaul link between the access communication link and the backhaul communication link, wherein:
   the access communication link is employed for access transmissions between the first network node device and a user equipment,
   the backhaul communication link is employed for backhaul transmissions between the first network node device and a second network node device, and
   the partition relates to a first bandwidth of the access communication link and a second bandwidth of the backhaul communication link.

2. The network equipment of claim 1, wherein the access transmissions and the backhaul transmissions are multiplexed on the integrated access and backhaul link.

3. The device of claim 1, wherein the first network node device comprises a transmit and receive point device for transmission and reception of packets of information.

4. The device of claim 1, wherein the first network node device comprises a distributed unit device.

5. The device of claim 1, wherein the analyzing comprises a determination of whether a data frame contains an indicator indicating a presence of an emergency responder communication.

6. The device of claim 1, wherein facilitating the adjustment comprises facilitating changing an amount of the first bandwidth.

7. The device of claim 1, wherein facilitating the adjustment comprises facilitating changing an amount of the second bandwidth.

8. The device of claim 1, wherein facilitating the adjustment comprises facilitating a change in a frequency of transmission of time slots allocated for transmissions on the access communication link.

9. The device of claim 1, wherein facilitating the adjustment comprises facilitating a change in a frequency of transmission of time slots allocated for transmissions on the backhaul communication link.

10. A method, comprising:
    facilitating, by a network controller device comprising a processor, modifying, based on a criterion, a partition of resources of an integrated access and backhaul link employed by a first distributed unit device between an access link of the integrated access and backhaul link and a backhaul link of the integrated access and backhaul link, wherein:
    the access link is employed for access transmissions between a first distributed unit device and a user equipment, the backhaul link is employed for backhaul transmissions between the first distributed unit device and a second donor unit device, and the partition relates to a first amount of bandwidth of the access link and a second amount of bandwidth of the backhaul link.

11. The method of claim 10, wherein facilitating the modifying of the partition is based on a presence of an indicator associated with network communication traffic and a network condition.

12. The method of claim 11, wherein the indicator indicates that the network communication traffic comprises an emergency communication.

13. The method of claim 10, further comprising:
receiving, by the network controller device, data from the first distributed unit device, wherein the data comprises information related to a network condition associated with the first distributed unit device.

14. The method of claim 10, wherein a criterion comprises a first link condition associated with the access link and a second link condition associated with the backhaul link.

15. The method of claim 12, further comprising, determining, by the network controller device, a path to route the emergency communication.

16. The method of claim 15, wherein determining the path is based on a number of intervening distributed unit devices between the first distributed unit device and a destination device.

17. A non-transitory machine-readable medium, comprising executable instructions that, when executed by a processor, facilitate performance of operations, comprising:
analyzing information related to a network condition associated with a network device employing an integrated access and backhaul link, wherein the integrated access and backhaul link comprises an access communication link integrated with a backhaul communication link; and facilitating changing, based on the analyzing, a partition of resources of the integrated access and backhaul link between the access communication link and the backhaul communication link, wherein:
the access communication link carries a first transmission between the network device and a user equipment,
the backhaul communication link carries a second transmission between the network device and a different network device, and
the partition relates to a first amount of bandwidth related to the access communication link and a second amount of bandwidth related to the backhaul communication link.

18. The non-transitory machine-readable medium of claim 17, wherein the operations further comprise:
determining whether an operator policy is applicable to the adjustment of the partition.

19. The non-transitory machine-readable medium of claim 17, wherein the operations further comprise:
selecting a path to route an emergency communication, and wherein selecting the path considers a number of intervening network devices between the network device and a destination device.

20. The non-transitory machine-readable medium of claim 17, wherein the operations further comprise:
managing the partition based on the adjustment.

\* \* \* \* \*